United States Patent [19]
van der Lely et al.

[11] Patent Number: 5,080,040
[45] Date of Patent: Jan. 14, 1992

[54] MILKING PLANT

[75] Inventors: Edwin van der Lely, Weverskade; Karel van den Berg, Boterbloemstraat; René Fransen, Prins Hendriklaan, all of Netherlands

[73] Assignee: C. van der Lely N.V., Maasland, Netherlands

[21] Appl. No.: 485,579

[22] Filed: Feb. 27, 1990

[30] Foreign Application Priority Data

Feb. 27, 1989 [NL] Netherlands .................. 89 00479

[51] Int. Cl.$^5$ ................................. A01J 5/04
[52] U.S. Cl. ................. 119/14.09; 119/14.14; 119/14.17
[58] Field of Search ............... 119/14.09, 14.14, 14.15, 119/14.17, 14.46

[56] References Cited

U.S. PATENT DOCUMENTS

| | | | |
|---|---|---|---|
| 2,703,067 | 3/1955 | Carson | 119/14.01 |
| 2,737,923 | 3/1956 | Duncan | 119/14.09 |
| 2,873,722 | 2/1959 | Duncan et al. | 119/14.09 |
| 2,873,723 | 2/1959 | Duncan et al. | 119/14.18 |
| 3,036,552 | 5/1962 | Duncan et al. | 119/14.18 |
| 3,289,633 | 12/1966 | Simons | 119/14.01 |
| 3,373,720 | 3/1968 | Duncan | 119/14.02 |
| 3,538,768 | 11/1970 | Duncan | 119/14.17 X |
| 3,586,043 | 6/1971 | Duncan | 119/14.05 X |
| 3,726,253 | 4/1973 | Duncan | 119/14.18 |
| 3,837,318 | 9/1974 | Duncan et al. | 119/14.08 |
| 3,874,337 | 4/1975 | Umbaugh et al. | 119/14.17 X |
| 3,919,975 | 11/1975 | Duncan | 119/14.05 |
| 4,034,712 | 7/1977 | Duncan | 119/14.36 |
| 4,231,324 | 11/1980 | Schletter | 119/14.17 |
| 4,287,853 | 9/1981 | Duncan | 119/14.55 |
| 4,351,271 | 9/1982 | Mueller et al. | 119/14.46 X |
| 4,513,830 | 4/1985 | Persbeck et al. | 119/14.17 X |
| 4,574,736 | 3/1986 | Tanaka et al. | 119/14.14 X |
| 4,648,350 | 3/1987 | Noorlander | 119/14.47 X |

FOREIGN PATENT DOCUMENTS

| | | |
|---|---|---|
| 81049 | 6/1983 | European Pat. Off. . |
| 88165 | 9/1983 | European Pat. Off. . |
| 300115 | 1/1989 | European Pat. Off. . |
| 3218005 | 11/1983 | Fed. Rep. of Germany . |
| 2272595 | 12/1975 | France . |
| 41115 | 10/1965 | German Democratic Rep. . |
| 7704853 | 11/1977 | Netherlands . |
| 8404654 | 12/1984 | PCT Int'l Appl. . |
| 2015861 | 9/1979 | United Kingdom . |
| 2055543 | 3/1981 | United Kingdom . |

Primary Examiner—Robert P. Swiatek
Attorney, Agent, or Firm—Penrose L. Albright

[57] ABSTRACT

A milking system for dairy animals comprising individual teat cups attachable to the respective teats of the animal's udder, a measuring device to determine the volume of milk discharged from individual teats, a central vacuum system to aid the discharge of the milk from the teats as well as to propel both the milk and the cleaning fluid through the system's fluid lines, a cooling tank, and an array of sensors to determine various parameters of the milk and milking system, including temperature sensors, milk conductivity sensors, air-to-milk ratio sensors, pressure sensors and fluid level sensors. The sensors are arranged at various points in the milking system, including in the individual teat cups, the milk measuring device and the discharge lines, and are optionally coupled to a central computer which controls both the individual components of the milking system and working parameters of the system as a whole, including an automatic cleaning system for cleaning the teat cups, fluid lines and cooling tank. The system diverts milk from the milk otherwise collected that has too high of a temperature or more than a predetermined conductivity indicating it may not have been produced in a healthy teat or udder.

82 Claims, 3 Drawing Sheets

MILKING PLANT

BACKGROUND OF THE INVENTION

The present invention relates to a milking plant for milking cows, which plant comprises teat cups that are connectable to the respective teats of a cow's udder, the milk obtained from each udder quarter capable of being conveyed with the aid of the said teat cups, through a separate line to a milk measuring device.

In prior art milking plants of the above-defined type, the teat cups are combined in one single milking claw, while the buffer space in the milking claw, to which space the teat cups are connected directly, comprises four separate chambers. Via four separate milk hoses the milking claw is connected to a milk meter, from which the milk can be separated or be supplied to a milk cooling tank. The four-quarter milking claw has for its object to provide a better means to maintain the udder in a healthy condition; the milk originating from an inflamed quarter has a higher conductivity than that from a healthy one. The electric conductivity of the milk can be measured for each quarter, whereafter it can be determined whether or not the milk must be separated.

Such a structure of the milking plant is not suitable when the single milking claw system is not being utilized, but a milking system wherein the teat cups are connected individually and independently of each other, e.g. by a milking robot, to the teats of the udder.

SUMMARY OF THE INVENTION

The object of the invention herein disclosed is to provide a milking plant which is not only suitable for use when one single milking claw is used, but also in those cases wherein the teat cups are connected individually and independently of each other.

According to the invention, the milking plant of the above-defined type is characterized in that the milk measuring device includes four milk meters, the separate discharge lines of which are coupled to a common discharge line terminating in a milk cooling tank. Due to the largely parallel structure of the milking system, there is effected an improved check on the milk production. The milk production can be effected from each udder quarter individually, while the teat cups can be removed independently of each other; consequently, the teats will not be burdened unnecessarily.

In addition, according to the invention, a milk meter includes a milk receptacle and a measuring chamber, in which connection the milk flows under a vacuum provided in the milk receptacle into the measuring chamber and is pumped in defined quantities by means of compressed air from the measuring chamber into the relevant, separate discharge line. In particular, according to the invention, the air sucked along by the vacuum together with the milk from the relevant teat cup is separated therefrom in the milk meter. Consequently, milk containing air is passed from the teat cup into the milk meter, whereas it is only the milk that is discharged therefrom to the milk cooling tank; in this respect it should be noted that so far it usually has been the custom to effect the milk-air separation not earlier than in the milk cooling tank. In a specific embodiment in accordance with the invention, the milk meter is provided with a valve rod which, in a first position under a vacuum, leaves the aperture between the milk receptacle and the measuring chamber open, and, in a second position by means of compressed air, closes same. More specifically, in accordance with the invention, there is provided a switching element, with the aid of which, in a first switching position thereof, the vacuum is applied to cause the valve rod to be brought to its first position, and, in a second switching position thereof, compressed air is admitted to cause the valve rod to be brought to its second position. Furthermore, according to the invention, the measuring chamber is provided with a milk level sensor, by means of which it is established when a defined quantity of milk is contained therein, after which it produces a control signal to cause the switching element to be adjusted from its first position to its second position. Also, in accordance with the invention, the switching element may be adjusted from its second position to its first position after a fixed period of time. However, this might also be effected by means of a sensor which senses that all the milk has been pumped from the measuring chamber, or by means of a flow sensor provided in the line beyond a teat cup. Furthermore, according to the invention, each time when a defined quantity of milk has been established in the measuring chamber, the milk level sensor may produce a control signal intended for a computer, in which the quantity of milk obtained from each udder quarter is recorded for each individual cow. In particular, the recording of this quantity and hence also that of the total quantity of milk obtained from each cow per unit of time, e.g. per day, may be kept on the basis of a progressive average calculated over a defined number of days.

According to the invention, the measuring chamber, when empty, is closed by a spherical body. Preferably, this spherical body is of such a design that, when the milk flows from the milk receptacle into the measuring chamber, it floats on the milk contained therein. Thus each time the measuring chamber contains a predetermined quantity of milk, is removed therefrom by means of the compressed air admitted into the chamber for that purpose. Furthermore, according to the invention, a non-return valve is included in the separate discharge pipe beyond the aperture in the measuring chamber, which aperture can be closed by the spherical body. Via this non-return valve the milk is passed from the measuring chamber, but only under the influence of compressed air. In the opposite direction, the non-return valve prevent reverse milk flow, which might be possible in case the pressure in the relevant discharge pipes should exceed that prevailing in the measuring chamber. This situation is conceivable because since the milk is discharged from four milk meters to the milk cooling tank through the same common discharge line. The presence of the non-return valve beyond the measuring chamber aperture that is closable by the spherical body implies that, during the milking operation, the first obtained milk fills the separate discharge pipe between the said aperture and the non-return valve, as a result of which, according to the invention, each time a cow is milked, the measured quantity of milk recorded by a computer is numerically increased only once by the known quantity of milk corresponding to the volume of the separate discharge pipe between the measuring chamber aperture that is closable by the spherical body and the non-return valve.

In order to ensure the admission of compressed air via the measuring chamber into the discharge lines, in particular when these lines must be cleared of milk thereby e.g. in connection with a subsequent rinsing procedure, in accordance with the invention, the milk meter is provided with a solenoid device which, by moving the spherical body, has for its object to establish a connection between the closed measuring chamber and the discharge lines.

According to the invention, each milk meter of the milk measuring device is provided with a milk conductivity sensor. More particularly, the milk conductivity sensor is arranged in the measuring chamber of a milk meter. The conductivity of the milk indicates the health of the udder. The milk originating from an inflamed quarter has a higher conductivity than that from a healthy one. The milk originating from an inflamed quarter must not be mixed with the rest of the milk. According to the invention, a separate discharge line is provided with a three-way valve, through which the milk discharged from a relevant milk meter is either diverted into the common discharge line or, after it has been found that the milk originates from an inflamed quarter, into a receptacle specially provided for the purpose. This three-way valve may be operated automatically as soon as a relevant milk conductivity sensor has measured a conductivity which exceeds a preset fixed value. In a preferred embodiment in accordance with the invention, however, the milk conductivity sensor applies a control signal to a computer, in which it is determined whether or not the relevant milk originates from an inflamed quarter, after which, when the former appears to be the case, the computer supplies a control signal to the three-way valve in the relevant separate discharge line in order that the milk in question is diverted to the receptacle. The conductivity of the milk from the individual quarters can be compared with each other in the computer, whereby it is possible to establish from the spread in the conductivity values a potential inflammation of one of the quarters. Older cows and cows in late lactation inherently have a higher milk conductivity than younger and freshly calved ones. It is therefore not advisable to compare deviations in conductivity to a preset fixed value, but to compare the deviations to the cow's own standard, i.e. to compare the conductivity in the computer with a progressive average determined over a number of days for the relevant cow. The calculation of the progressive average may, of course, be combined with the afore mentioned calculation of the spread.

According to the invention, a milk meter is provided with a tube stop valve, with the aid of which the vacuum connection of the milk meter can be closed after milking. The end of the milking procedure can be detected by means of sensors, e.g. with the aid of a milk flow sensor which may be incorporated in the line between the teat cup and the milk meter or in the milk meter itself, or with the aid of the afore mentioned milk level sensor. In accordance with the invention, it is likewise possible to activate the tube stop valve after a milking period of a duration laid down in a computer, e.g. on the basis of the number of times the measuring chamber has been emptied, has ended, i.e. by applying thereto a control signal supplied by the computer. In a specific embodiment, the tube stop valve includes a lifting mechanism to allow air to flow into the milk meter simultaneously with or immediately after closure of the vacuum connection of the measuring chamber. This can be effected with a certain amount of overpressure; a simpler method is to operate the lifting mechanism, in accordance with the; invention, by a valve in the outer wall of the milk meter. The tube stop valve in accordance with the invention renders it possible, in a simple manner, to remove the vacuum in a teat cup before the teat cup is removed from the teat or drops therefrom.

The milking plant is provided in customary manner with a vacuum pump having a vacuum balance tank to increase the vacuum stability. For larger plants in particular, preferably, the pump and the balance tank are arranged remote from each other and the balance tank is positioned close to the milking parlor. The balance tank has a plurality of vacuum connections: for each milk measuring device there are four connections for the vacuum connection of the individual milk meters, four connections for the valve rod control in each milk meter, and a connection for an electronic pulsator system for the four teat cups. A separate pulsator may be provided for each teat cup. The suction-rest ratio in the pulsator system may be adjustable, i.e. that for the rear quarters may be adjusted independently of that for the front quarters. According to the invention, the suction-rest ratio can be set by a computer depending on the milk flow. When the milk flow decreases, it will be possible to provide a comparatively longer rest. This contributes to a reduction in the burdening of the teats, which is of the utmost importance when the animal is milked several times a day. According to the invention, a throttle ring is included in the vacuum connection from the balance tank to a milk meter. This ring prevents, should one of the teat cups fall from a teat, fluctuations from occurring in the prevailing vacuum and more particularly in the vacuum in the other teat cups. So as to ascertain whether a vacuum is present in a milk meter, in accordance with the invention, there is provided an air flow sensor in the vacuum connection between the throttle ring and the milk meter.

In the situation wherein the four teat cups are incorporated in one single milking claw, the claw housing, whether or not divided into four compartments, constitutes a buffer space for the milk transport and for counteracting fluctuations in the vacuum under the teats to which the teat cups are connected. In order to obtain the same result in the situation wherein the teat cups are not incorporated in one single milking claw, but are connected to an associated milk meter which is in a relatively more remote position, in accordance with the invention, a teat cup is provided with such a buffer space at its lower end. In particular, this buffer space for the milk transport is in connection with the outer air via an air suction aperture. In connecting the teat cups, it is optionally possible, in order to facilitate this connection, to employ an increased vacuum, although in that case more air is drawn in.

It must be possible for the milk line system to be rinsed after milking. In accordance with the invention, for this purpose there is included in the common discharge line a three-way valve, through which in a first position thereof the milk is passed via the common discharge line to the milk cooling tank, whereas in its second position the three-way valve establishes a rinse line system. In particular, the rinse line system includes a rinse jetter which, with the object of flushing the lines, is connected to a teat cup, while a rinsing fluid is passed by the vacuum in a milk meter from a rinsing fluid container through a first rinsing line to the rinse jetter and from there, via a teat cup, into the relevant milk meter, whereafter the rinsing fluid is returned through the relevant separate discharge line, the common discharge line, the three-way valve incorporated therein, and a second rinsing line to the rinsing fluid container. Prior to rinsing, all the milk must first have been forced from the lines to be rinsed, in particular all the milk present in the common discharge line must have been forced through the three-way valve incorporated therein. In order to be able to establish that this has indeed occurred, according to the invention, an air-milk sensor is provided in the common discharge line in front of the three-way valve incorporated therein.

Furthermore, in accordance with the invention, a heat exchanger is provided in the common discharge line in front of the three-way valve incorporated therein as a precooling device for the milk cooling tank.

In accordance with the invention, the milk cooling tank may be included in a circular line, to which the common discharge lines of the individual milk meters are connected. More generally, therefore, the invention relates to a milk measuring system for milking cows, which system comprises a milk cooling tank, characterized in that this milk cooling tank is included in a circular line, the discharge lines of the individual milk meters being connected to the said circular line. In order to prevent that, after milking, residual milk remains in the circular line, in accordance with the invention, the circular line is provided with a pump to pump the milk from the milk cooling tank therethrough. Preferably, the circular line should be thermally insulated. With the milk being circulated from the milk cooling tank, this keeps the milk inside the tank in motion and there is no longer any necessity to provide other means, such as a stirrer, for accomplishing the same function. In a preferred embodiment in accordance with the invention, the milk cooling tank is provided with a rinsing fluid supply line, through which, after all the milk has been removed from the milk cooling tank, a rinsing fluid can be introduced into the milk cooling tank, which rinsing fluid is circulated through the circular line by means of the pump. In particular, the pump can operate at two speeds, i.e. the milk is circulated at a relatively low speed and the rinsing fluid at a relatively high speed. Furthermore, in accordance with the invention, a three-way valve is incorporated in the circular line, by means of which the circulating rinsing fluid can be discharged. In order to perform the rinsing of the milk cooling tank in a most advantageous manner, in accordance with the invention, the milk cooling tank includes a sprayer connected to the rinsing fluid supply line; by mounting this sprayer in such a way that it is movable, so that the entire inner surface of the milk cooling tank can be covered thereby, an extremely efficient rinsing system is obtained.

For a better understanding of the invention and to show how the same may be carried into effect, reference will now be made, by way of example, to the accompanying drawings, in which.

BRIEF DESCRIPTION OF THE DRAWINGS

DESCRIPTION OF THE PREFERRED EMBODIMENT

Figure 1:
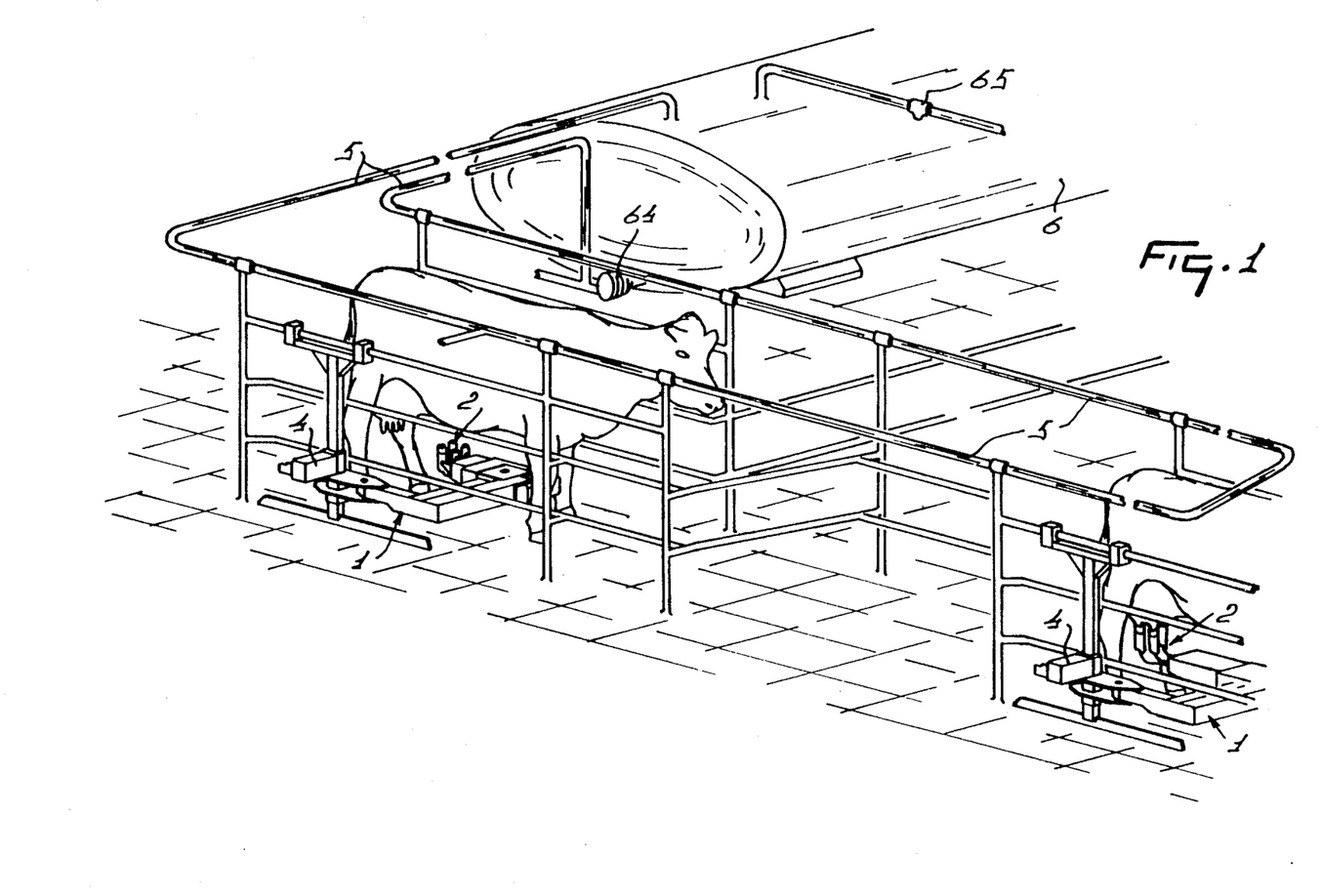
FIG. 1 shows schematically an arrangement of a milking plant for milking cows.

FIG. 1 shows a schematic arrangement of a milking plant for milking cows. Only two milking parlors are shown by way of illustration, in each of which a cow is present. Corresponding components in the drawings have been denoted by the same reference numerals. For each milking parlor there is provided a milking robot 1 having four teat cups 2 at its end. The invention, as such is completely independent of the manner in which the teat cups are connected; the teat cups may, combined in one single milking claw, be connected together as well as individually and independently of each other to respective teats of a cow's udder. The milk obtained from each udder quarter with aid of the teat cups 2 can be conveyed through a separate line 3 (see FIG. 2) to a milk measuring device 4. From milk measuring device 4 the milk is conveyed via a circular line 5, to which the discharge lines of the various milk measuring devices in the various milking parlors are connected, to a milk cooling tank 6.

Figure 2:
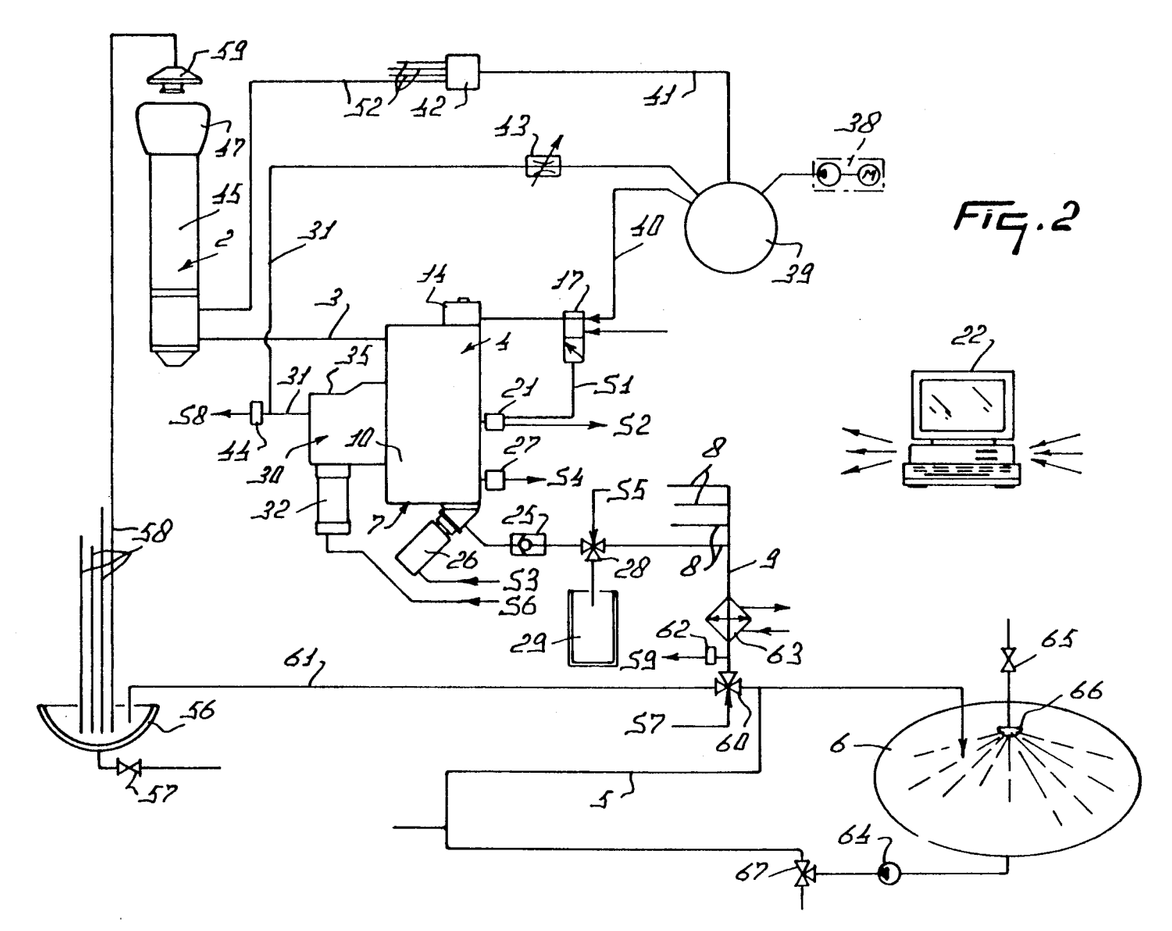
FIG. 2 shows a basic arrangement of the milking plant in accordance with the invention.
Figures 3, 4:
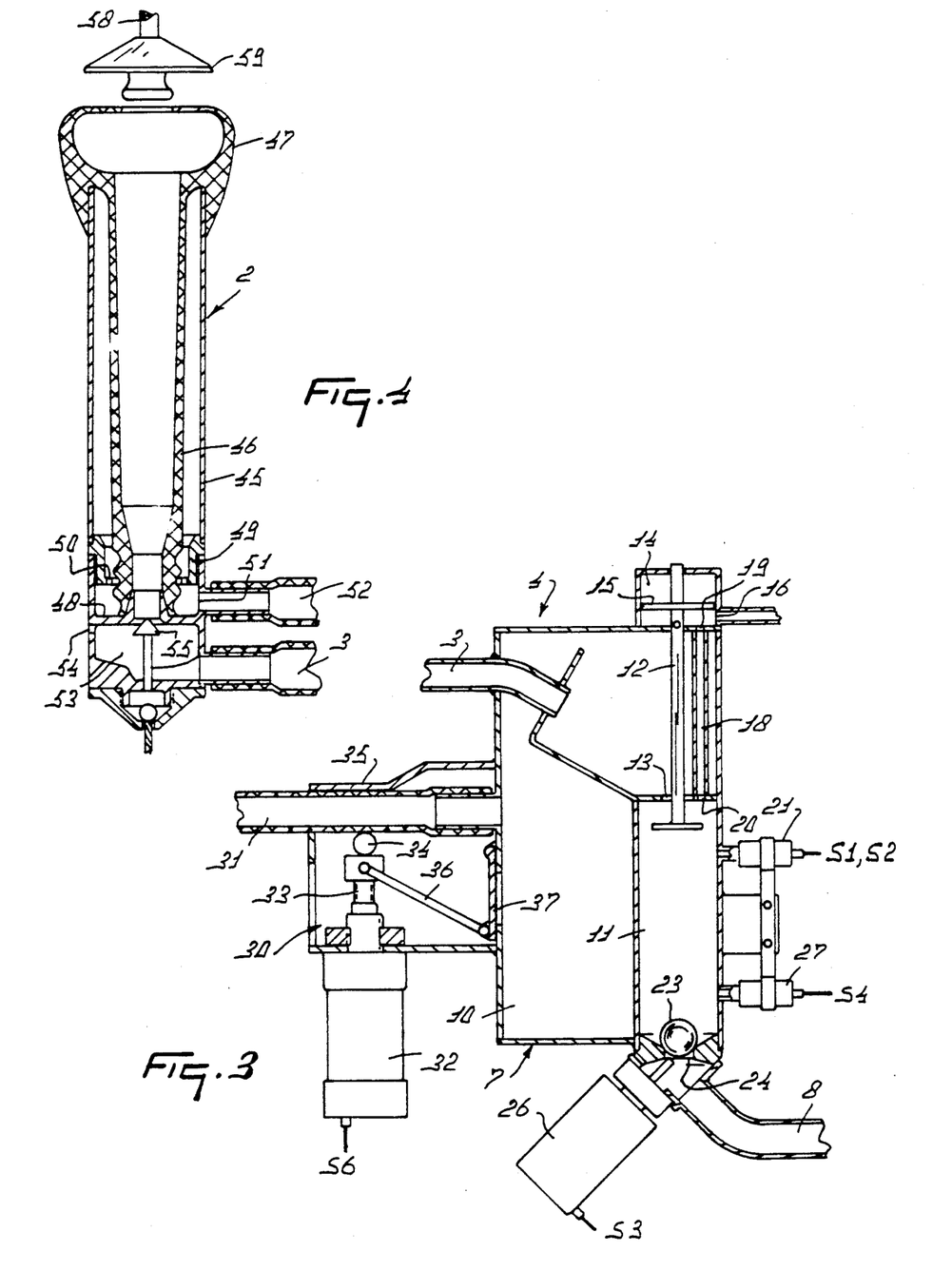
FIG. 3 is a more detailed representation of the basic structure of a milk meter in the arrangement shown in FIG. 2.
FIG. 4 is a more detailed representation of the basic structure of a teat cup in the arrangement shown in FIG. 2.

The milk measuring device 4 comprises four milk meters 7, only one of which is shown in FIG. 2. FIG. 2 furthermore illustrates the basic arrangement of the milking plant, only one teat cup 2 and only one milk meter 7 having been shown in this arrangement for the sake of simplicity. The individual discharge lines 8 of the milk meters 7 are coupled to a common discharge line 9, which leads to the recirculating line 5 and, via line 5 a milk cooling tank 6. FIG. 3 is a more detailed representation of the basic structure of a milk meter as is incorporated in the milking plant shown in FIG. 2. The milk meter 7 includes a milk receptacle 10 and a measuring chamber 11, in which connection the milk flows under a vacuum produced on milk receptacle 10 through the separate line 3 connected to the teat cup 2 into measuring chamber 11 and is pumped in defined quantities by means of compressed air from the measuring chamber 11 into the separate discharge line 8. The milk meter 7 includes a valve rod 12 which, in a first (shown) position under a vacuum, leaves the aperture 13 between the milk receptacle 10 and the measuring chamber 11 open, and, in a second (not-shown) position by means of compressed air, closes same. At its upper side, the milk meter includes a chamber 14, in which chamber the valve rod 12 has a piston 15. The valve rod 12 is capable of upward and downward movement in and through this chamber 14. In the space below the piston 15 there is provided in the wall of the chamber 14 an aperture 16. Via this aperture 16, the milk meter 7 is connected to a switching element 17 (see FIG. 2). In a first position of this switching element 17, a vacuum is applied to cause the valve rod 12 and the piston 15 to be moved downwardly to its first position, thereby leaving the aperture 13 open. In a second position of this switching element 17, compressed air is admitted into the space below the piston 15 to cause the valve rod 12 and the piston 15 to be moved upwardly to its second position, thereby closing the aperture 13. The milk meter 7 furthermore includes a tube 18 which, via relatively narrow apertures 19 and 20, is connected to the space in the chamber 14 below the piston and to the measuring chamber 11, respectively. When compressed air is admitted into the space below the piston 15, the aperture 13 is closed immediately and the air is forced into the measuring chamber 11 via the aperture 19, the tube 18 and the aperture 20, as a result of which the milk present in the measuring chamber 11 is passed into the separate discharge line 8.

The measuring chamber 11 is provided with a milk level sensor 21, by means of which it is determined when a defined quantity of milk is contained therein. When the milk level in the measuring chamber 11 has reached that of the sensor 21, this sensor 21 supplies a control signal S1 (see FIG. 2) to cause the switching element 17 to be adjusted from its first position to its second position, so that the measuring chamber 11 can be emptied. After a fixed period of time, the switching element 17 is adjusted from its second position to its first position; this period of time is of such a duration that there is sufficient time for the measuring chamber 11 to be emptied. When the switching element 17 has returned to its first position, the measuring chamber 11 can be filled again. The milk level sensor 21 can also apply a control signal S2 to a computer 22, in which the quantity of milk obtained from each udder quarter is recorded for each individual cow.

In the lower part of the measuring chamber 11 there is provided a spherical body 23. When the measuring chamber 11 is empty, this spherical body 23 closes the aperture 24 between the measuring chamber 11 and the separate discharge line 8. The spherical body 23 is made of such a material that, when the milk flows from the milk receptacle 10 into the measuring chamber 11, it floats on the milk contained therein. When the milk is forced from the measuring chamber 11 into the separate discharge line 8, the aperture 24 is closed automatically by the spherical body 23 once the measuring chamber 11 is empty. A non-return valve 25 (FIG. 2) is arranged in the separate discharge line 8 beyond the aperture 24 in the measuring chamber, preferably as closely as possible therebeyond. Via this non-return valve 25 the milk is allowed to pass from the measuring chamber 11 but only under the influence of compressed air. In the opposite direction, the non-return valve 25 blocks any milk flow which might be possible in case, for whatever reason, the pressure in the relevant discharge lines would exceed that prevailing in the measuring chamber 11 in front of the non-return valve 25. When, during the milking operation, the first obtained milk flows into the measuring chamber 11, then not only the measuring chamber 11 itself will be filled, but also the space in the separate discharge line 8 between the non-return valve 25 and the said aperture 24. By each subsequent pump stroke it is only the milk contained in the measuring chamber that is pumped off, so that the total quantity of milk as determined by the computer during, milking for each udder quarter must be increased only initially by the quantity of milk corresponding to the volume of the separate discharge line 8 between the non-return valve 25 and the said aperture 24. This is, however, a constant correction to be entered into the computer 22 on recording of the quantity of milk obtained. After milking, the milk must also be forced from the separate discharge lines 8 and the common discharge line 9, i.e. into the circular line 5 to the milk cooling tank 6. For that purpose, the aperture 24 in the measuring chamber 11 must be free so as to allow compressed air to pass. To that end, the milk meter 7 is fitted with a solenoid device 26 which moves the spherical body 23 upwardly in response to a control signal S3 supplied by the computer 22.

The milk meter 7 includes a milk conductivity sensor 27, which sensor, preferably, is arranged in the measuring chamber 11. The control signal S4 supplied by the milk conductivity sensor 27 is a udder's condition of health in the case of mastitis, the conductivity of the milk is higher than that of the milk obtained from a healthy udder or from a healthy udder quarter. The milk originating from an inflamed udder quarter must be separated off. For this purpose, the separate discharge line 8 is provided with a three-way valve 28 (FIG. 2), through which the milk pumped from the milk meter 7 is either passed into the common discharge line 9 or, after it has been found that the milk originates from an inflamed quarter, into a receptacle 29 specially provided for the purpose. The three-way valve 28 might be operated automatically as soon as the signal S4 produced by the milk conductivity sensor 27 indicates a value which exceeds a preset value. It is, however, more advantageous to apply the control signal S4 to the computer 22 which, taking account of the further conditions of the specific cow, supplies a control signal S5, by means of which the three-way valve 28 can be operated.

In addition, the milk meter 7 is provided with a tube stop valve 30, with the aid of which the vacuum connection 31 can be disconnected from the milk meter after milking. During milking, a vacuum prevails in the milk receptacle 10. After the milking procedure has ended, the vacuum must be removed, and it is not until then that the teat cups are removed from the teats. Prior to removing the vacuum from the milk receptacle 10, the vacuum line 31 must be closed first. For that purpose, after a milking period preset in the computer 22 has elapsed, a control signal S6 is applied to the electromagnet 32 of the tube stop valve 30. By means of the then energized electromagnet 32, a rod 33 having a spherical end 34 is moved upwardly to seal the vacuum connection 31 against the fixed stop 35. With the aid of a lifting mechanism 36 which is connected pivotably to the rod 33, a valve 37 in the wall of the milk receptacle 10 is drawn upwards simultaneously, as a result of which air can flow freely thereinto.

The milking plant as shown schematically in FIG. 2 includes in a customary manner a vacuum pump 38 having a vacuum balance tank 39 to increase the vacuum stability. The balance tank 39 has a plurality of vacuum connections. A vacuum connection 31 is provided for the milk receptacle 10 of each milk meter 7. A vacuum connection 40 is present for each switching element 17. In addition, a vacuum connection 41 is provided for an electronic pulsator system 42 for the four teat cups. In the vacuum connection 31 there is incorporated a throttle ring 43 to prevent fluctuations in the vacuum of the various milk meters due to falling off of one of the teat cups. In order to be able to ascertain whether a vacuum is present in the milk meter, there is arranged an air flow sensor 44 in the vacuum connection between the throttle ring 43 and the relevant milk meter, which sensor supplies the computer 22 with a control signal S8 indicating the presence of vacuum in the line 31. Hereby this signal also forms an indication whether the teat cups are connected correctly.

FIG. 4 shows a longitudinal cross-sectional view of a teat cup 2; this teat cup in a customary manner has a solid, e.g. metal, sleeve 45, an inner wall 46 made of a flexible material, e.g. rubber, enclosed thereby, and a rubber cap 47 which seals the space between the sleeve 45 and the inner wall 46 at the upper side. At the lower side, the space between the sleeve 45 and the inner wall 46 is sealed by a sealing ring 48, while at some distance thereabove there is provided between the sleeve 45 and the inner wall 46 a ring 49 having an aperture 50. Between sealing ring 48 and ring 49 there is located a space, in which the electronic pulsator system 42 produces through the line 52 and via an aperture 51 a pulsating vacuum, thereby effecting in the space between sleeve 45 and inner wall 46 a pulsating vacuum which causes the inner wall 46 to close firmly around the teat, when the teat cup is connected thereto, or causes the inner wall to move outwards again, whereby a rhythmic movement is provided around the teat as required for the milking operation to be performed. In order to function as a buffer for the milk to be collected and to minimize the fluctuations in the vacuum under the teat, there is provided in the lower part of the teat cup 2 a buffer space 53, in which a relatively narrow bleeder opening or air suction aperture 54 is made for the milk transport. The line 3, intended for the discharge of the milk to the milk meter 7, is connected to this buffer space 53. In addition, the buffer space 53 contains a fixed element 55, which element partly projects into the aperture between the teat space and the buffer space 53 to ensure that the milk flows gradually into the buffer space 53 and a splitting of the milk is prevented. At the upper end of the fixed element 55 a sensor can be provided to perform a temperature measurement. The temperature of the milk indicates the body temperature of the cows to be milked; the latter temperature is higher than normally with cows in heat and with sick cows.

In order that the milk line system can be rinsed once the milking operation has been completed, an arrangement is included for effecting this step. To that end, there is provided a rinse line system which is constituted by a rinse fluid container 56 having a valve 57, a first rinse line 58, a rinse jetter 59 which can be fitted around the end of the teat cup 2 in a fluid-tight manner, the teat cup 2, the line 3, the milk meter 7, the separate discharge line 8, the common discharge line 9, a three-way valve 60 incorporated therein and a second rinse line 61. In its first position, the three-way valve 60 admits milk from the common discharge line 9 into the circular line 5, and, in its second position, rinse fluid from the common line 9 into the second rinse line 61. After the milking, a rinse command can be delivered by the computer 22 which, to that end, applies a control signal S7 to the three-way valve 60 to adjust same to the appropriate position. Prior to starting the rinsing step after the milking operation has ended, the discharge lines must first be freed from milk. This is effected by passing compressed air through the measuring chamber 11, as a result of which the spherical body 23 is pushed upwardly and the aperture 24 is released. Forward of the three-way valve 60 there is incorporated in the common discharge line 9 an air-milk sensor 62, which sensor applies a control signal S9 to the computer, on the basis of which control signal the computer can establish when there is no longer any milk present in the common line—compressed air then passing the air-milk sensor 62 instead of milk—so that the valve 60 can be adjusted for the rinsing procedure. Due to the vacuum in the milk receptacle 10, rinse fluid is drawn from the rinse fluid container 56 through the first rinse line 58, the rinse jetter 59, the teat cup 2 and the line 3 to the milk receptacle 10, from where it flows into the measuring chamber 11. Thereafter it is pumped from chamber 11 in the same manner as the milk and is fed back via the separate discharge line 8, the common discharge line 9, the three-way valve 60 and the second rinse line 61 to the rinse fluid container 56.

In the common discharge line 9 there is arranged before three-way valve 60 incorporated therein a heat exchanger 63 as a pre-cooler for the milk cooling tank.

In customary manner, the milk cooling tank 6 is incorporated in the circular line 5, to which via relevant three-way valves 60 the common discharge lines of the individual milk meters 7 are connected. A pump 64 is incorporated in the circular line 5. This pump can operate at at least two different speeds. In order to keep the milk in motion and to prevent milk residues from being deposited in the circular line 5, the milk is circulated at a relatively low speed from the milk cooling tank 6 through the circular line 5. Preferably, in this connection, the circular line 5 is thermally insulated. Usually, the milk cooling tank 6 is emptied a few times a week, whereafter it can be rinsed. A rinsing fluid can be introduced into the milk cooling tank 6 via a valve 65 and a spray nozzle 66. When the spray nozzle 66 is arranged so as to be capable of moving, it can cover the entire inner surface of the milk cooling tank 6. The rinsing fluid is circulated by the pump in the circular line at a relatively high speed and is ultimately discharged via a three-way valve 67. Also here, the valves 65, 67, the spray nozzle 66 and the pump 64 can be controlled from the computer 22.

Although in FIG. 2 they are shown as being single, several elements are provided fourfold for each milking device; in particular this holds for the rinse jetters, the teat cups and the milk meters, as well as for the lines connected thereto and the elements incorporated therein (valves and sensors). Preferably, however, the four milk meters are combined into one single milk measuring device.

Having disclosed our invention, what we claim as new and to be secured by Letters Patent of the United States is:

1. A milking plant for milking cows which comprises a set of four separate teat cups that are each connectable to the respective teats of a cow's udder, a separate milk discharge line leading from each separate teat cup, a separate milk measuring device receiving each said milk discharge line, a further separate discharge line leading from each said milk measuring device, a common discharge line receiving each of the further separate discharge lines, and a milk cooling tank receiving said common discharge line, wherein the milk obtained from each udder quarter with the aid of said teat cups is conveyed through said separate milk discharge line to said milk measuring device, and wherein said milk measuring devices and said further separate discharge lines are coupled to said common discharge line which terminates in said milk cooling tank.

2. A milking plant as claimed in claim 1, wherein each said milk measuring device includes a milk receptacle and a milk measuring chamber, wherein milk flows under a vacuum from said milk receptacle into said measuring chamber and is pumped in predetermined quantities by means of compressed air from said measuring chamber into the corresponding said further separate discharge line.

3. A milking plant as claimed in claim 2, comprising air-milk separation means whereby air drawn along by vacuum together with the milk from each said teat cup is separated therefrom in said corresponding milk measuring device.

4. A milking plant as claimed in claim 2, comprising an aperture between said milk receptacle and said measuring chamber, a vacuum source, and a compressed air source, each said milk measuring device comprising a milk meter, a valve rod for each said milk meter, said valve rod adapted to be in a first position wherein it is the subject to a vacuum from said vacuum source, wherein said aperture is open and to be in a second position wherein compressed air from said compressed air source causes said valve to close said aperture.

5. A milking plant as claimed in claim 4, comprising a switching element which has a first switching position wherein vacuum from said vacuum source is applied to cause said valve rod to move to its first position and said switching element having a second switching position wherein compressed air from said compressed air source is admitted to move with said valve rod to its said second position.

6. A milking plant as claimed in claim 5, comprising a milk level sensor means in said milk measuring chamber, said milk level sensor means adapted to sense the receipt of a predetermined quantity of milk in said milk measuring chamber and to provide a control signal which causes said switching element to move from its said first switching position to its said second switching position upon sensing the presence of said predetermined quantity of milk in said milk measuring chamber.

7. A milking plant as claimed in claim 6, comprising a computer wherein said milk level sensor means transmits a signal each time said predetermined quantity of milk has been received in said milk measuring chamber to said computer which records the quantity of milk received from each udder quarter for each individual cow.

8. A milking plant as claimed in claim 5, comprising timing means for causing said switching element to move from its said second switching position to its said first switching position after a predetermined period of time.

9. A milking plant as claimed in claim 2, comprising an outlet from said milk measuring chamber and a spherical body which is adapted to close said outlet when said measuring chamber is empty.

10. A milking plant as claimed in claim 9, wherein said spherical body is adapted to float on the milk contained in said milk measuring chamber.

11. A milking plant as claimed in claim 10, comprising a non-return valve in each said separate discharge line downstream of said outlet.

12. A milking plant as claimed in claim 11, comprising means for recording the amount of milk received from each udder quarter for each individual cow wherein such milk is received in the corresponding said milk measuring chamber and increasing the amount of milk so recorded only once for each milking operation by the quantity of milk corresponding to the volume of said separate discharge line between said milk measuring chamber's outlet and said non-return valve.

13. A milking plant as claimed in claim 3, comprising an electro-magnetic means which is adapted to displace said spherical body for removal of residual milk downstream of said outlet.

14. A milking plant as claimed in claim 2, comprising a milk-conductivity sensor in each said milking device.

15. A milking plant as claimed in claim 14, wherein each said milk conductivity sensor is associated with the corresponding said milk measuring chamber in said milk measuring device wherein it is located.

16. A milking plant as claimed in claim 15, comprising a three-way valve in said separate discharge line, means for controlling said three-way valve by signals from said conductivity sensor so that when the conductivity of milk in the corresponding said milk-measuring chamber indicates the milk originates from an inflamed quarter, said three-way valve is controlled to divert such milk into a receptacle provided for receiving such diverted milk.

17. A milking plant as claimed in claim 16, wherein said means for controlling said three-way valve includes a computer whereby said milk conductivity sensor applies a control signal to said computer wherein it is determined whether or not the relevant milk originates from an inflamed quarter, after which, when the former appears to be the case, said computer transmits a control signal to said three-way valve in said corresponding said separate discharge line which diverts the milk in question to be discharged to said receptacle.

18. A milking plant as claimed in claim 2, comprising a vacuum connection with said milk measuring device, a tube stop valve, said tube stop valve including means for opening and closing said vacuum connection and for breaking the vacuum in said milk measuring device when it closes said vacuum connection.

19. A milking plant as claimed in claim 18, comprising a computer and controller sensing means interconnected with said milk measuring device and said tube stop valve with said computer to activate said tube stop valve to close after a preset time upon said controller sensing means sensing from said milk measuring device that milking from the teat cup involved has ceased.

20. A milking plant as claimed in claim 18, comprising a lifting mechanism included in said tube stop valve, said lifting mechanism adapted to admit air into said milk measuring device simultaneously with or immediately after said tube stop valve closes said vacuum connection.

21. A milking plant as claimed in claim 20, comprising a valve in an outer wall of said milk measuring device that said lifting mechanism operates to admit air into said milk measuring device.

22. A milking plant as claimed in claim 2, comprising a vacuum pump and a vacuum balance tank associated therewith to increase the stability vacuum produced by said vacuum pump, conduit means connecting said vacuum balance tank with each of said milk measuring devices, a throttle valve provided in said conduit means.

23. A milking plant as claimed in claim 22, comprising an air flow sensor for sensing whether or not a vacuum is present, said air flow sensor being provided between said throttle valve and each of said milk measuring devices.

24. A milking plant as claimed in claim 2, comprising a buffer space at the lower end of each said teat cup for receiving milk from said corresponding teat cup and for counteracting fluctuations in the vacuum under the teat to which the corresponding said teat cup is connected.

25. A milking plant as claimed in claim 24, comprising a bleed hole from the atmosphere into said buffer space.

26. A milking plant as claimed in claim 24, comprising a fixed element which projects upwardly in said buffer space so as to receive milk from the teat which is in the corresponding said teat cup, said fixed element being arranged and constructed to reduce turbulence in milk which flows from a teat in said teat cup into said buffer space.

27. A milking plant as claimed in claim 24, comprising temperature sensing means in said buffer space for sensing the temperature of milk received in said buffer space.

28. A milking plant as claimed in claim 25, comprising a fixed element in said buffer space disposed in the flow of milk received into said buffer space, said temperature sensing means mounted on said fixed element.

29. A milking plant as claimed in claim 2, comprising a computer, a flow sensing means, and an electronic pulsator system, the suction/rest ratios of said electronic pulsation system required for milking being adjusted by said computer in dependence on said milk flow from the teat cup involved as measured by said flow sensing means.

30. A milking plant as claimed in claim 1, comprising a rinse line system and a three-way valve in said common discharge line, said three-way valve having a first position wherein milk is passed via said common discharge line to said cooling tank and a second position which connects to said rinse line system.

31. A milking plant as claimed in claim 30, wherein said rinse line system includes a rinse fluid container, a first rinse line, a second rinse line and a rinse jetter which for the purpose of flushing lines which normally carry milk in the plant is connected to said teat cup, a rinse fluid being transmitted from said rinse fluid container, through said first rinse line, to said rinse jetter and from there, via a said teat cup, into the corresponding said milk measuring device, whereafter the rinse fluid is returned through the corresponding separate milk discharge line, said common discharge line, said three-way valve incorporated therein, and said second rinse line back to said rinse fluid container.

32. A milking plant as claimed in claim 31, comprising an air-milk sensor in said common discharge line for sensing when all milk has been forced through said three-way valve.

33. A milking plant as claimed in claim 30, comprising a heat exchanger provided in said common discharge line upstream of said three-way incorporated therein.

34. A milking plant as claimed in claim 1, comprising a circulation loop which includes said milk cooling tank therein, said common discharge line connected to said circulation loop.

35. A milking plant as claimed in claim 34, comprising a pump in said circulation loop for circulating milk through said circulation loop including through said milk cooling tank.

36. A milking plant as claimed in claim 35, comprising a pump in said circulation milk conduit line and a rinsing fluid supply line connected to said circulation milk conduit line through which, after all milk has been removed from said milk cooling tank, a rinsing fluid can be admitted from said rinsing fluid supply line into said milk cooling tank which rinsing fluid is circulated through said circulation milk conduit line by means of said pump.

37. A milking plant as claimed in claim 36, wherein said pump has two operating speeds, the milk being circulated by said pump at a relatively low rate by one of said operating speeds and a rinsing fluid being circulated at a relatively high rate by the other of said operating speeds.

38. A milking plant as claimed in claim 37, comprising a sprayer in said milk cooling tank, said sprayer being connected to said rinsing fluid supply line.

39. A milking plant as claimed in claim 38, wherein said sprayer is movable for cleaning the interior of said milk cooling tank.

40. A milking plant as claimed in claim 36, comprising a three-way valve incorporated in said circulation milk conduit line through which said rinsing fluid circulating in said circulating milk conduit line can be discharged.

41. A milking plant for milking cows, wherein said plant includes teat cups readily connectable to corresponding teats of a cow's udder, fluid lines from said teat cups conveying milk to milk measuring means, said milk measuring means comprising a plurality of milk meters, each of said milk meters comprising a milk receptacle, a measuring chamber and a discharge line therefrom, each of said discharge lines from said plurality of milk meters connected to a common discharge line, and a milk cooling tank coupled with said common discharge line.

42. A milking plant in accordance with claim 41, comprising an air separation means included in said milk receptacle.

43. A milking plant as claimed in claim 41, wherein each of said milk meters comprises a chamber of known volume, a plurality of sensors, a piston and a one-way float valve, for measuring a predetermined quantity of milk by serially filling and emptying said chamber.

44. A milking plant as claimed in claim 43, wherein said piston controls the introduction and discharge of milk from said chamber, a device comprising a vacuum line and a valve switching element controlling the action of said piston, said switching element being controlled by the amount of fluid in said measuring chamber.

45. A milking plant as claimed in claim 44, comprising independent timing means for controlling the cyclic functions of said valve switching means.

46. A milking plant as claimed in claim 44, comprising a vacuum system which includes a vacuum pump, a pressure balancing chamber, and connections for a plurality of further systems including said milk measuring device, said valve switching element, and said teat cup.

47. A milking plant as claimed in claim 46, wherein said vacuum system comprises a flow sensor located in a conduit provided between said pressure balancing chamber and said milk measuring means to determine the presence or absence of a working vacuum and a computer means connected to said flow sensor for recording said presence or absence of a working vacuum.

48. A milking plant as claimed in claim 47, wherein a flow throttle is located in said conduit between said pressure balancing chamber and said milk measuring device which is adapted to close said conduit in the absence of a vacuum.

49. A milking plant as claimed in claim 48, wherein said flow throttle is controlled by said computer means.

50. A milking plant as claimed in claim 43, comprising a fluid level sensor which senses milk in said measuring chamber.

51. A milking plant as claimed in claim 43, which comprises a conductivity sensor.

52. A milking plant as claimed in claim 51, wherein each said discharge line comprises a one-way non-return valve disposed proximate to its connection to said measuring chamber and a three-way valve between said non-return valve and the said common discharge line.

53. A milking plant as claimed in claim 52, wherein said conductivity sensor directly controls said three-way valve.

54. A milking plant as claimed in claim 43, comprising computer means for recording and maintaining a continuing record of the volume of milk discharged from each said chamber.

55. A milking plant as claimed in claim 54, wherein said computer means initially accounts for the volume of milk which will already be disposed in the said discharge line at the outset of its recording procedure.

56. A milking plant as claimed in claim 55, wherein said non-return valve comprises a ball valve.

57. A milking plant as claimed in claim 43, wherein a computer means records and maintains a continuing record on the conductivity of the milk received through each said measuring chamber.

58. A milking plant as claimed in claim 57, comprising solenoid means for lifting said ball valve from its seat.

59. A milking plant as claimed in claim 58, wherein said computer means controls said solenoid means.

60. A milking plant as claimed in claim 41, comprising a computer which controls the flow of milk from said teat cups to said milk cooking tank.

61. A milking plant as claimed in claim 41, comprising a vacuum producing means connected to each said milk meter by a corresponding vacuum line and a stop valve for each said vacuum line.

62. A milking plant as claimed in claim 61, comprising computer means for activating said valve after a preset period of time.

63. A milking plant as claimed in claim 61, comprising a lifting means to open a valve means in said milk receptacle, said valve means being open to the atmosphere.

64. A milking plant as claimed in claim 63, comprising means for operating said lifting means simultaneously with said stop valve.

65. A milking plant as claimed in claim 41, wherein each said teat cup comprises a rigid metallic sheath, a flexible membrane within said sheath, a pressure buffer chamber at said teat cup's lower end, and a connection for a vacuum for moving milk received in said teat cups.

66. A milking plant as claimed in claim 65, wherein said pressure buffer chamber comprises a small opening to admit air from the atmosphere.

67. A milking plant as claimed in claim 65, wherein said pressure buffer chamber comprises an element disposed vertically into proximate relation with the space in said teat cup for receiving a cow's teat to reduce agitation of milk discharged into said buffer chamber.

68. A milking plant as claimed in claim 67, wherein said pressure buffer chamber comprises an element disposed vertically so that it is in proximate relationship with the space in said teat cup for receiving a cow's teat, said vertically disposed element comprising a temperature sensor, said temperature sensor being in communication with computer means for selectively diverting milk received from said teat cup which is above a predetermined temperature from milk otherwise received from said teat cups.

69. A milking plant as claimed in claim 65, comprising a computer, said computer controlling the duration and timing of movements by said flexible membrane in its pulsation which causes the cow's teat to discharge milk into said teat cup.

70. A milking plant as claimed in claim 41, wherein said common discharge line comprises a plurality of connections for said milk measuring means, a sensor, and a heat exchanger.

71. A milking plant as claimed in claim 41, comprising an air-to-milk ratio sensor.

72. A milking plant as claimed in claim 71, wherein said air-to-milk ratio sensor produces signals to a computer, said computer maintaining the information of said signals as a control parameter for the milking plant.

73. A milking plant as claimed in claim 41, which comprises a pre-cooler disposed in said common discharge line.

74. A milking plant as claimed in claim 73, wherein said pre-cooler is disposed in said common discharge line by way of a recirculation system.

75. A milking plant as claimed in claim 73, comprising a flow line having means for connecting it to said common discharge line, to said cooling tank, and to a recirculating pump which is disposed in said common discharge line.

76. A milking plant as claimed in claim 75, comprising insulation which insulates said flow line.

77. A milking plant as claimed in claim 75, wherein said recirculating pump has two speeds, one circulating milk in said milk cooling tank and one for spraying cleaning liquid in said cooling tank.

78. A milking plant for milking cows as claimed in claim 41, comprising a cleaning and rinsing system.

79. A milking plant as claimed in claim 78, wherein said cleaning and rinsing system comprises a fluid container for cleaning and rinsing fluid, said common discharge line includes a three-way valve, and a cleaning and rinsing jet is provided which is readily attachable to each said teat cup.

80. A milking plant as claimed in claim 79, comprising a vacuum system wherein said cleaning and rinsing fluid is circulated by said vacuum system.

81. A milking plant as claimed in claim 79, comprising computer means wherein said three-way valve is controlled by said computer means.

82. A milking plant as claimed in claim 79, comprising a recirculation system for recirculating fluid into and from said cooling tank, a connection and a spray for cleaning the interior of said cooling tank operatively connected to said recirculation system.

* * * * *